United States Patent [19]

Neamtu

[11] 4,321,846  
[45] Mar. 30, 1982

[54] TOOL HOLDER

[75] Inventor: Nicolae Neamtu, Weymouth, Mass.

[73] Assignee: The Gillette Company, Boston, Mass.

[21] Appl. No.: 141,557

[22] Filed: Apr. 18, 1980

[51] Int. Cl.³ .............................................. B23B 29/10
[52] U.S. Cl. ................................... 82/36 R; 407/107; 407/109; 407/111
[58] Field of Search ................... 82/36, 46; 407/5, 11, 407/111, 107, 109, 108

[56] References Cited

U.S. PATENT DOCUMENTS

| | | | |
|---|---|---|---|
| 2,799,079 | 7/1957 | Brigner | 407/5 |
| 2,848,790 | 8/1958 | McMann | 407/11 |
| 3,052,952 | 9/1962 | Bader et al. | 407/5 |
| 3,191,262 | 6/1965 | Gustafson | 407/109 |
| 3,375,742 | 4/1968 | Sturm | 82/36 |
| 3,500,522 | 3/1970 | Stier | 407/111 |
| 3,603,186 | 9/1971 | Vigor et al. | 82/46 |
| 3,798,725 | 3/1974 | Hanson | 407/11 |
| 3,802,042 | 4/1974 | Novkov | 407/107 |
| 3,848,302 | 11/1974 | Hudson | 407/107 |

Primary Examiner—Leonidas Vlachos  
Attorney, Agent, or Firm—Scott R. Foster

[57] ABSTRACT

A tool holder for retaining a cutting tool, the toolholder including a body portion, a clamp portion operably connected to the body portion, the body portion having a first jaw portion, the clamp portion having a second jaw portion, the jaw portions being adapted to receive the cutting tool therebetween, and a holding strap pivotally mounted on one of the jaw portions, the holding strap having a flat surface for engagement with a surface of the cutting tool.

2 Claims, 4 Drawing Figures

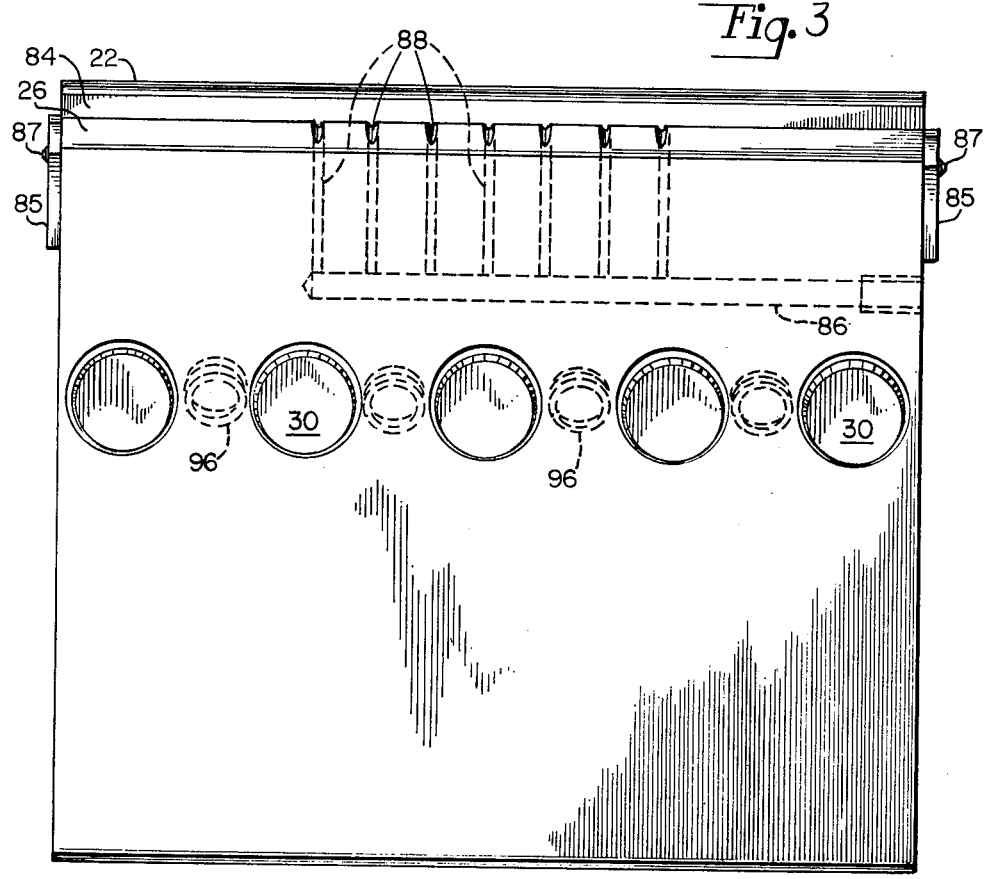

TOOL HOLDER

BACKGROUND OF THE INVENTION

1. Field of the Invention

The invention relates to toolholders and is directed more particularly to a toolholder for retaining a cutting tool.

2. Description of the Prior Art

A machine for peeling a thin metal strip from a cylindrical metal billet is disclosed in U.S. Pat. No. 3,460,366. The machine includes a drive motor, a headstock and gearbox, a spindle for mounting a cylindrical metal billet, a rigidly supported cutting tool, and a wind-up mechanism for coiling the resultant strip of metal. The spindle-mounted cylindrical metal billet is rotated by the motor while the cutting tool shaves a thin strip of metal from the peripheral edge of the billet.

A toolholder for use in conjunction with the above-described machine is disclosed in U.S. Pat. No. 3,603,186. The toolholder includes pistons reciprocated by hydraulic pressure to move wedges having cam surfaces against a shaft. The resultant force on the shaft and on an interconnected clamp member causes movement of the latter toward the body of the toolholder and against the cutting tool. The cutting tool is quickly released from the toolholder by applying hydraulic pressure to an opposite side of the piston to disengage the wedges and the clamping shaft which loosens the clamp member. Upon insertion of a fresh cutting tool into the toolholder, hydraulic pressure is again applied to force the wedges against the clamping shaft which causes the clamp member to press against the cutting tool.

SUMMARY OF THE INVENTION

An object of the present invention is to provide an improved toolholder for use in conjunction with machines of the type above-described.

With the above and other objects in view, as will hereinafter appear, a feature of the present invention is the provision of a toolholder for retaining a cutting tool, the toolholder including a body portion, a clamp portion operably connected to the body portion, the body portion having a first jaw portion, the clamp portion having a second jaw portion, the jaw portions being adapted to receive the cutting tool therebetween, and a holding strap pivotally mounted on one of the jaw portions, the holding strap having a flat surface for engagement with a surface of the cutting tool.

BRIEF DESCRIPTION OF THE DRAWINGS

Reference is made to the accompanying drawings in which is shown an illustrative embodiment of the invention from which its novel features and advantages will be apparent.

In the drawings:

FIG. 3 is a top plan view of the toolholder; and

DESCRIPTION OF THE PREFERRED EMBODIMENT

Figure 1:
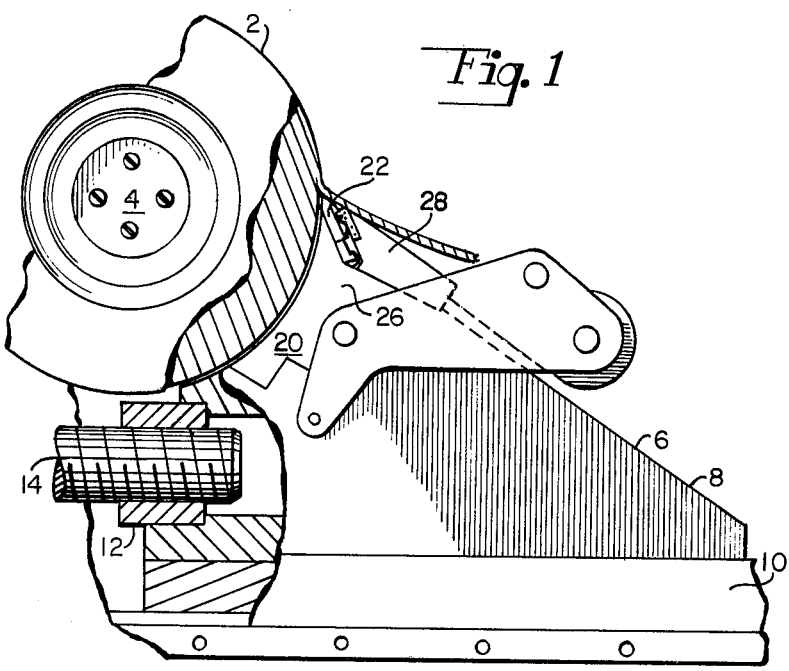
FIG. 1 is an elevational view, partly in section, showing the toolholder in operative position to peel a strip from a billet.

Referring to FIG. 1, it will be seen that a solid cylindrical billet 2 is mounted upon a spindle 4 for rotation.

A cutting tool assembly 6 has a frame 8 which is moved along ways 10 by a nut 12 and a screw 14. The frame 8 supports a toolholder 20.

Figure 2:
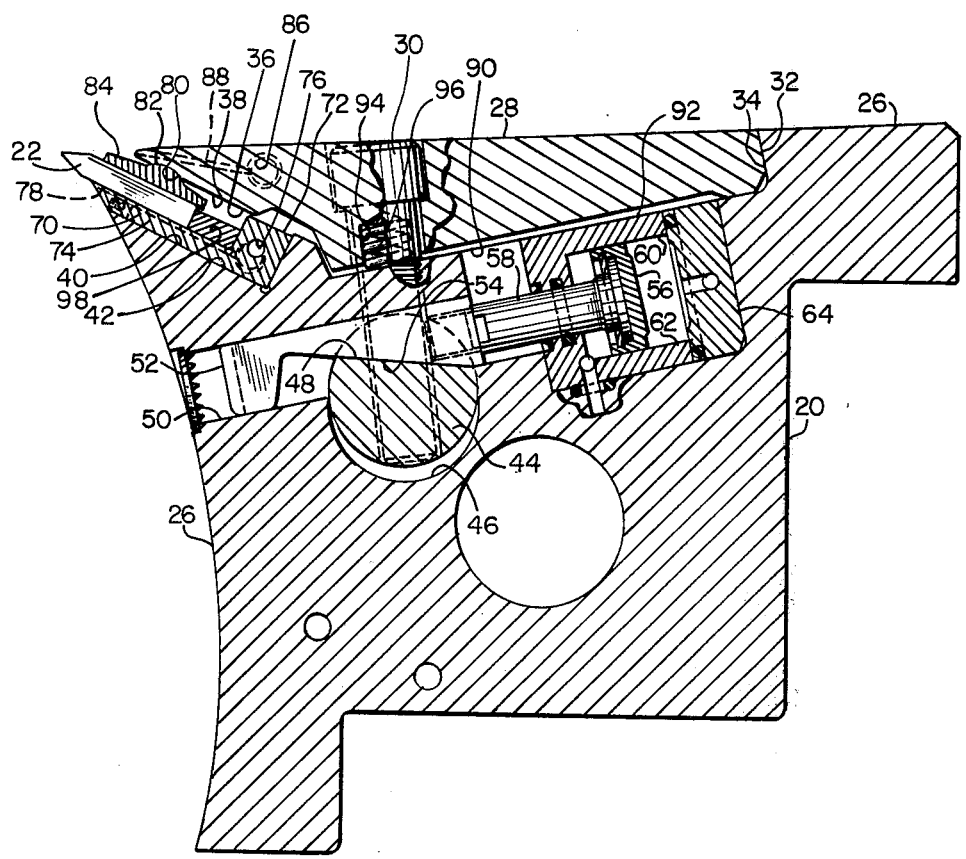
FIG. 2 is an enlarged sectional view of the toolholder.

A cutting tool 22 is supported by the toolholder 20 which is mounted on the cutting tool assembly 6. The cutting tool assembly 6 includes a body portion 26 and a clamp portion 28. The clamp portion 28 is secured to the body portion 26 by screws 30 (FIG. 2). A rear edge 32 of the clamp portion 28 rests against a surface 34 on the body portion 26. A front surface 36 of the clamp portion 28 forms a jaw 38 for exercising a clamping force on the cutting tool. A surface 40 of the body portion 26 forms an opposed jaw 42.

The clamp portion 28 is pressed against the body portion 26 and is caused to exercise the clamping force on the cutting tool by the application of force on the screws 30 which extend through the clamp portion 28 and are threaded into a clamping shaft 44 and rests within an elliptical channel 46. The clamping shaft 44 extends across the width of the toolholder substantially parallel with the axis of the rotation of the billet. The shaft 44 has a flat bearing surface 48 which forms an inclined plane. A plurality of bores 50 extending normal to and intersecting the channel 46 house wedge members 52 which are reciprocal within the bores 50. The wedge members 52 have cam surfaces 54 thereon which form inclined bearing surfaces engaged with the bearing surface 48 of the shaft 44. The bearing surface 48 and the cam surfaces 54 coact to exert a downward force on the shaft 44 and the clamp portion 28 which is connected to the shaft 44 by the screws 30.

Each wedge member 52 is connected to a piston 56 by a piston rod 58. The pistons 56 reciprocate within cylinders 60 in response to the application of hydraulic pressure on opposite sides of the pistons. The cylinders 60 are formed in a rectangular block 62 and a cylinder head 64 retained in the toolholder.

Disposed in the jaw 42 is a tool pad 70 having a base portion 72 and a cutter support portion 74. The cutter support portion 74 is adapted to engage a first side of the cutting tool 22. The base portion 72 is provided with a cooling fluid channel 76 from which extend cooling fluid runners 78 adapted to carry cooling fluid to the vicinity of the cutting edge of the cutting tool 22.

Figure 4:
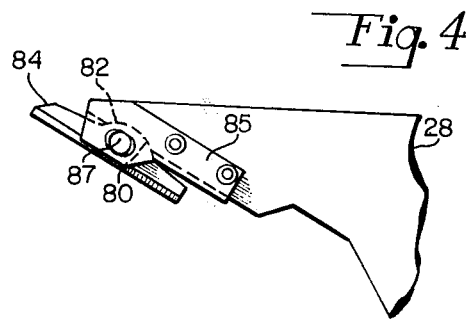
FIG. 4 is a side elevational view of a portion thereof.

The jaw 38 is provided with a recess 80 which receives a protrusion 82 extending from a holding strap 84 which is adapted to engage a second side of the cutting tool 22. Thus, the cutting tool 22 is held between the tool pad support portion 74 and the holding strap 84. In turn, the tool pad 70 and holding strap 84 are held between the jaws 38, 42. The clamp portion 28 is provided at either end thereof with a bracket 85 (FIGS. 3 and 4) which receives a pin 87 extending from either end of the holding strap 84, the pins 87 being pivotally movable in the brackets 85.

The clamp portion 28 is provided with a cooling fluid channel 86 from which extend cooling fluid runners 88 adapted to carry cooling fluid to the vicinity of the cutting edge of the cutting tool 22.

The clamp portion 28 is provided with a lower surface 90 which is opposed to an upper surface 92 of the body portion 26 of the toolholder 20. The surface 90 is provided with bores 94 in which are disposed coil springs 96. The upper ends of the springs 96 bear against the closed ends of the bores 94, while the lower ends of the springs bear against the upper surface 92 of the body portion 26. The springs accordingly urge the clamp portion 28 upwardly, but the clamp portion is retained by the screws 30 in close proximity of the body portion 26.

A nose key 98 is disposed between a base edge of the cutting tool 22 and the base portion 72 of the tool pad 70, to facilitate adjustment of the cutting edge of the cutting tool 22 relative to the center line of the billet 2.

In operation, hydraulic pressure causes the piston rod 58 and the wedge members 52 to move toward the left, as viewed in FIG. 2. The cam surfaces 54 coact with the bearing surface 48 on the shaft 44 to exert a downward force on the screws 30 and a downward clamping force on the clamp portion 28, against the bias of the springs 96. The downward force on the clamp portion 28 pivots the clamp portion about its rearward edge 32 against the surface 34 on the toolholder body portion 26 and urges the clamp portions' forward surface 36 toward the cutting tool 22. The holding strap 84 moves pivotally in the recess 80 and the brackets 85 to maintain contact with the cutting tool substantially throughout the surface area of the holding strap. Thus, the pivotal movement of the clamp portion is compensated for by the pivotal movement of the holding strap so that surface contact between the cutting tool and the holding strap is unchanged.

To release the cutting tool, hydraulic pressure moving the piston rod 58 to the right, as viewed in FIG. 2, will facilitate loosening of the clamping force upon the cutting tool, through expansion of the springs 96, and removal of the tool from the holder.

During a peeling operation, cooling fluid is forced through the channels 76, 86 and thence through the runners 77, 88 to provide a continuous supply of cooling fluid into the cutting zone on either side of the cutting edge of the cutting tool.

It is to be understood that the present invention is by no means limited to the particular construction herein disclosed and/or shown in the drawings, but also comprises any modifications or equivalents within the scope of the disclosure.

Having thus described my invention, what I claim as new and desire to secure by Letters Patent of the United States is:

1. A toolholder retaining a cutting tool having an elongated cutting edge, said toolholder comprising a body portion, a clamp portion operably connected to said body portion for pivotal movement thereon about a pivot axis parallel with said cutting edge, said body portion having a first jaw portion, said first jaw portion having therein a first elongated recess extending inwardly of the body portion from an edge thereof, a tool pad disposed in said recess and extending substantially throughout the length of said recess and parallel to said pivot axis, said tool pad including a first wall having a tool engaging surface adapted to engage a first side of said tool, and a second wall disposed in a bottom portion of said jaw portion, a nose key resting against said first and second tool pad walls and adapted to engage an edge of said tool opposite a cutting edge of said tool, said clamp portion having a second jaw portion including a second elongated recess extending parallel to said pivot axis, said jaw portions being adapted to receive said cutting tool therebetween, and a holding strap pivotally mounted on said second jaw portion, said holding strap having an elongated protrusion extending therefrom and pivotally disposed in said second recess, said holding strap having a flat surface for engagement with a second surface of said cutting tool, said clamp portion and said tool pad being provided with conduits for cooling fluid, said conduits having openings in said clamp portion and said tool pad proximate the cutting edge of said cutting tool and on either side thereof.

2. The invention in accordance with claim 1 in which brackets are mounted on said clamp portion, and said holding strap is pivotally mounted on said brackets.

* * * * *